United States Patent [19]
Carleer

[11] Patent Number: 5,882,017
[45] Date of Patent: Mar. 16, 1999

[54] ADAPTIVE ANTI-ROLL DEVICE

[76] Inventor: Jan Carleer, Sitsingenstraat 31, 3721 Vliermaalroot, Belgium

[21] Appl. No.: 858,353

[22] Filed: May 19, 1997

[51] Int. Cl.[6] .................................................. B60G 21/055
[52] U.S. Cl. ..................................... 280/5.508; 280/5.511; 280/124.107; 267/187; 267/191
[58] Field of Search ............................ 280/5.508, 5.511, 280/124.107, 124.106, 124.149, 124.152, 124.166; 267/187, 188, 191, 277

[56] References Cited

U.S. PATENT DOCUMENTS

| | | | |
|---|---|---|---|
| 1,971,960 | 8/1934 | Huntman | 267/187 |
| 2,140,733 | 12/1938 | Carroll . | |
| 2,208,969 | 7/1940 | Focht | 267/187 |
| 2,825,610 | 3/1958 | Jakowchuk . | |
| 2,828,138 | 3/1958 | Brueder . | |
| 2,843,396 | 7/1958 | Lucien . | |
| 2,849,225 | 8/1958 | Lucien . | |
| 3,349,973 | 10/1967 | Smith . | |
| 3,473,330 | 10/1969 | Fritz . | |
| 3,550,992 | 12/1970 | Grancon . | |
| 3,567,244 | 3/1971 | Hoffmann et al. . | |
| 4,647,068 | 3/1987 | Asami et al. . | |
| 4,652,010 | 3/1987 | Sugasawa . | |
| 4,696,489 | 9/1987 | Fujishiro et al. . | |
| 4,768,627 | 9/1988 | Taylor . | |
| 4,834,419 | 5/1989 | Kozaki et al. . | |
| 4,919,444 | 4/1990 | Leiber et al. | 280/5.511 |
| 4,962,943 | 10/1990 | Lin | 280/5.511 |
| 4,973,077 | 11/1990 | Kuwayama et al. . | |
| 5,106,120 | 4/1992 | DiMaria . | |
| 5,217,245 | 6/1993 | Guy . | |
| 5,632,502 | 5/1997 | Oppitz et al. | 280/124.106 |

FOREIGN PATENT DOCUMENTS

| | | |
|---|---|---|
| 0354113 | 2/1990 | European Pat. Off. . |
| 2303976 | 11/1976 | France . |
| 1138646 | 10/1962 | Germany . |
| 2006131 | 5/1979 | United Kingdom . |

Primary Examiner—Peter C. English
Attorney, Agent, or Firm—Harness, Dickey & Pierce, PLC

[57] ABSTRACT

A vehicle suspension apparatus operating between the sprung and unsprung masses of a vehicle includes a pendular anti-roll bar connected to the vehicle and a pair of links which connect the bar to the wheels. The anti-roll bar includes a pair of selectively activated anti-roll bar restrictors mechanically communicating with the central a rod of the anti-roll bar. In response to the roll above a predetermined threshold, at least one of the restrictors is actuated in order to clamp the roll bar and prevent axial twist of the central section beyond the actuated restrictor, thereby varying the torsional length of the roll bar central rod. The change in the torsional length of the central rod correspondingly changes the stiffness of the roll bar.

15 Claims, 3 Drawing Sheets

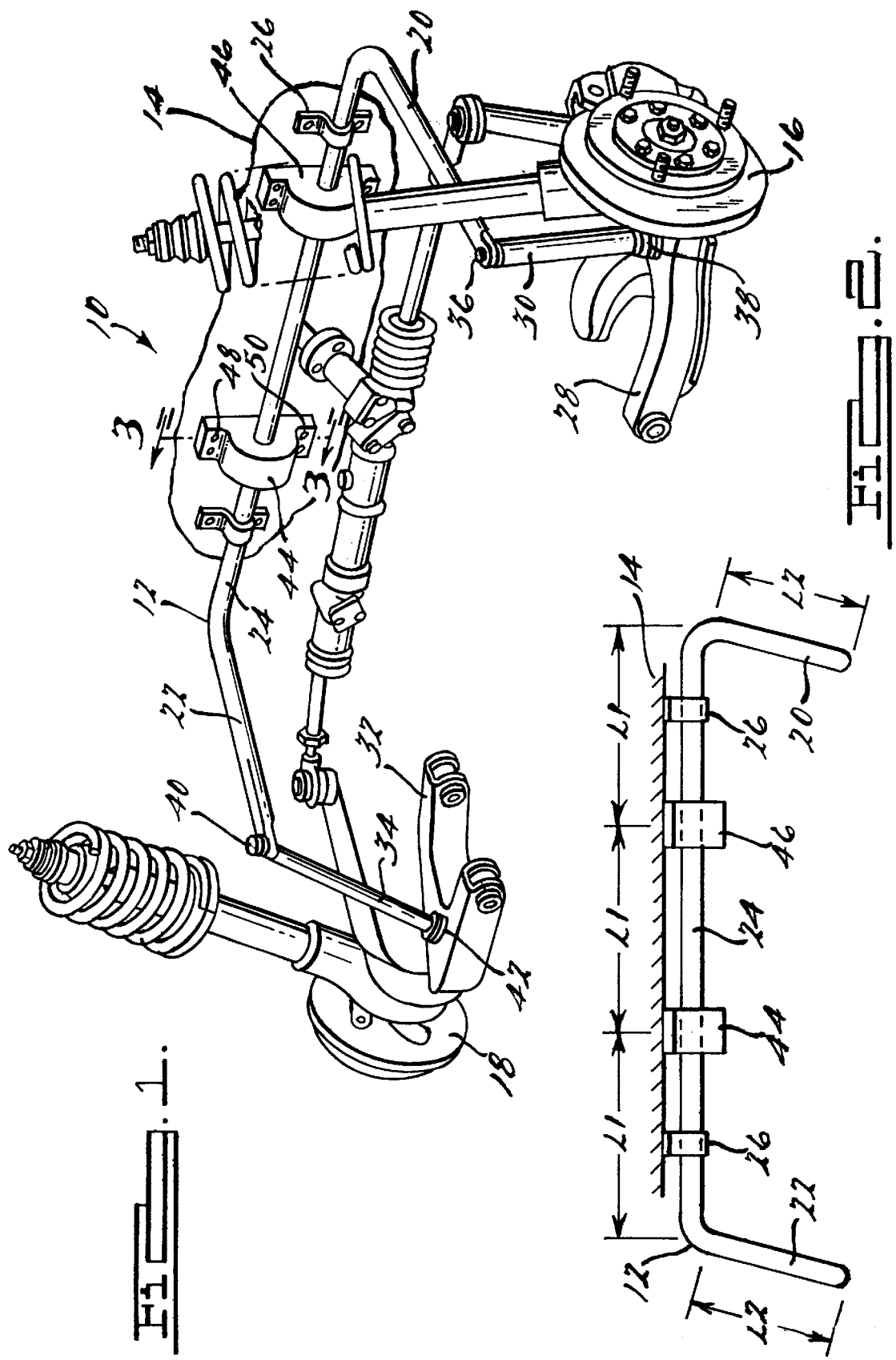

ADAPTIVE ANTI-ROLL DEVICE

FIELD OF THE INVENTION

This invention is directed to an automotive suspension system and involves an anti-roll bar restrictor device for enabling the user to vary the suspension roll stiffness, automatically or manually, between the normal roll stiffness of the anti-roll bar when the restrictor is deactivated and an increased roll stiffness when the restrictor is activated whereby to control the ride and handling characteristics.

BACKGROUND OF THE INVENTION

A conventional anti-roll bar is U-shaped and operates to assist in maintaining the vehicle body (i.e., the sprung mass) in a substantially horizontal operation when viewed along the vehicle's longitudinal roll axis. For example, when a vehicle turns to the left, the inertial forces raise the left side of the vehicle body and lower the right side of the vehicle body. The lowering of the right side of the vehicle body results in a relative rise of the right side reaction arm of the anti-roll bar. Correspondingly, during the left turn, the left side of the vehicle rises, resulting in a relative lowering of the left side reaction arm of the anti-roll bar. The combined rise of the right side reaction arm and relative lowering of the left side reaction arm induces axial twist in the center portion extending between the reaction arms. The axial twist of the center portion urges the relative downward movement of the right side reaction arm and the relative upward movement of the left side reaction arm. The combined relative downward urging of the right side reaction arm and the upward urging of the left side reaction arm raises the right side of the body and lowers the left side of the body (i.e., the sprung mass) respectively. This results in an upward anti-roll force on the right side of the vehicle body and a corresponding downward anti-roll force on the left side of the vehicle body, thereby resisting roll of the body induced by the left turn. The stiffness of the anti-roll bar will be determined by the torsional stiffness of the center section. It will be understood by one skilled in the art that an identical effect occurs, but at opposite sides, during turns in the opposite direction (i.e., to the right).

SUMMARY OF THE INVENTION

This invention provides a vehicle suspension apparatus to achieve one of the following objectives. A primary objective can be to increase roll stiffness from a nominal low roll setting to a selectable high roll setting or to diminish the roll angle of a car body in high roll conditions without decreasing passenger comfort during nominal highway conditions. Another objective can be to increase vehicle comfort by using a less stiff anti-roll bar during nominal conditions and increasing roll stiffness during high roll conditions by providing a mechanism for varying anti-roll bar stiffness. Yet another objective can be to reduce pitching or rolling of the sprung mass by stiffening the anti-roll bar. Yet another objective can be providing an anti-roll bar having a range of stiffnesses which is selectable in accordance with the roll of the sprung masses.

In accordance with this invention, a suspension system for a motor vehicle comprises two largely vertical coupling links or rods adapted to be connected between ends of an anti-roll bar which is pivoted on the vehicle chassis (i.e., the sprung mass) and respective road wheel suspensions linkages at opposite sides of the vehicle (i.e., the unsprung masses). Each coupling link has its opposite ends pivotably connected, respectively, to one reaction arm of a torsional anti-roll bar and to the suspension linkages of one of the front wheels (i.e., a suitable reaction point on the suspension).

A selectively operable first roll bar restrictor mechanically communicates with the roll bar central section (i.e., the torsional portion) of the anti-roll bar. The restrictor enables rotational movement of the central section in a first operating mode and limits rotational movement of the central section in a second operating mode. Further, a selectively operable second roll bar restrictor mechanically communicates with the roll bar central section. The second roll bar restrictor enables rotational movement of the central section in a first operating mode and limits rotational movement of the central section in a second operating mode.

Advantageously, the automotive suspension system herein provides an apparatus and method of varying suspension roll stiffness between a first softer suspension roll mode and a second harder suspension roll mode.

Advantageously, the suspension system herein will allow control of suspension roll stiffness by actuating the anti-roll bar restricting device positioned toward the outside of a turn in a first direction and the other anti-roll bar restricting device positioned toward the outside of a turn in the other direction.

Advantageously, the restricting device increases the stiffness of the anti-roll bar, thereby urging the vehicle frame towards a horizontal orientation.

The foregoing and other objects, and advantages, will become more apparent when viewed in light of the accompanying drawings and following detailed descriptions wherein.

BRIEF DESCRIPTION OF THE DRAWINGS

FIG. 1 is a perspective view of a preferred embodiment of a vehicle suspension system according to this invention wherein the anti-roll bar passes through two selectively activated restricting devices which are in turn connected to the vehicle body;

FIG. 2 is a perspective view of the anti-roll bar, its connection points, and the anti-roll bar restricting devices according to a preferred embodiment of this invention;

DETAILED DESCRIPTION OF THE PREFERRED EMBODIMENT

Figure 3:
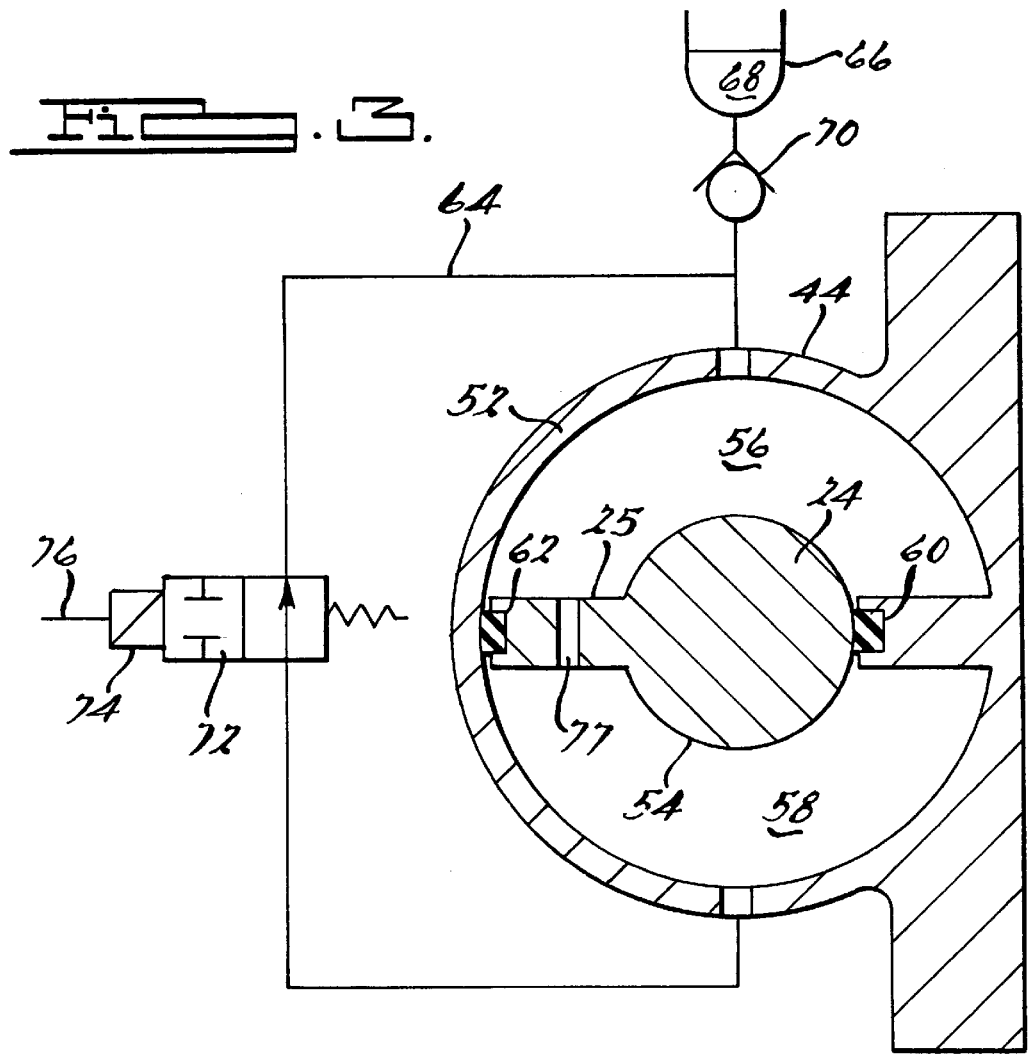
FIG. 3 is a cross-section taken along line 3—3 of the clamping device shown in FIG. 1 and the hydraulic circuit for actuating an anti-roll bar restricting device.

Turning now to the drawings, FIG. 1 shows various parts of a suspension system 10 of a vehicle, including an anti-roll bar 12 rigidly secured to the bulkhead 14 of the vehicle for coupling a vehicle frame (i.e., the sprung mass) with a pair of wheel assemblies 16 and 18 (i.e. the unsprung masses). The construction of a vehicle suspension is well known to those skilled in the art and will be only briefly described herein. The description fits equally well to any automotive suspension assembly. The invention herein has application to both front and rear wheel vehicle suspension systems.

The anti-roll (or roll or stabilizer) bar 12, which is bent as a "U", is disposed along the width of the vehicle and in a horizontal plane. Anti-roll bar 12 includes reaction arms 20 and 22 and is coupled at its central rod 24 to the bulkhead 14 (i.e., the sprung mass) by a pair of bushings 26 so that central rod 24 can rotate and twist torsionally about its axis and the respective ends of arms 20 and 22 will undergo vertical pendular movement. The end of reaction arm 20 of roll bar 12 is coupled to a suspension control arm 28 or an axle side by a coupling link 30, and the end of reaction arm 22 is similarly coupled to a suspension control arm 32 or axle side by a coupling link 34. Coupling link 30 is connected at pivots 36 and 38, respectively, to reaction arm 20 and suspension control arm 28. Similarly, coupling link 34 is connected at pivots 40 and 42, respectively, to reaction arm 22 and suspension control arm 32. Any vertical motion from suspension control arm 28 or axle side is transmitted directly to reaction arm 20 of the anti-roll bar 12, and the same occurs similarly at the other side.

In accordance with this invention, anti-roll bar 12 is arranged to pass through selectively activated restrictor devices (or restrictors) 44 and 46. Restrictors 44 and 46 are secured to the sprung mass at bulkhead 14, or other suitable attachment point located on the sprung mass, via mounting legs 48 and 50 (shown only with respect to restrictor 44). Restrictors 44 and 46 are preferably located at one-third the overall length from each end of central rod 24. Of course, it will be understood by one skilled in the art that the location of restrictors 44 and 46 may be varied in accordance with the desired stiffening effect restrictors 44 and 46 exert on anti-roll bar 12.

Anti-roll bar 12 operates to assist in maintaining the vehicle body (i.e., the sprung mass) in a substantially horizontal orientation when viewed along the vehicle's longitudinal roll axis. For example, when a vehicle turns to the left, the inertial force raises the left side of the vehicle body and lowers the right side of the vehicle body. The lowering of the right side of the vehicle body results in a relative rise of reaction arm 22. Correspondingly, during a left turn, the left side of the vehicle body rises, resulting in a relative lowering of reaction arm 20. The combined relative rise of reaction arm 22 and relative lowering of reaction arm 20 induces axial twist of central rod 24. The axial twist (or rotation) of central rod 24 urges the relative downward movement of reaction arm 22, and the relative upward movement of reaction arm 20. The combined relative downward urging of reaction arm 22 and the upward urging of reaction arm 20 raises the right side of the body and lowers the left side of the body (i.e., the sprung mass) respectively. This results in an upward anti-roll force on the right side of the vehicle body and a corresponding downward anti-roll force on the left side of the vehicle body, thereby resisting roll of the body induced by the left turn. It will be understood by one skilled in the art that an identical effect occurs, but at opposite sides, during turns in the opposite direction (i.e., to the right). Further, it will be appreciated by one skilled in the art that the torsional force exerted by central rod 24 varies in inverse proportion to the length of the rod being twisted. That is, as the length of horizontal rod 24 decreases, the torsional force increases.

In accordance with this invention, FIG. 2 depicts the anti-roll bar 12 of FIG. 1 and related components and will be referred to in order to demonstrate the principles of the present invention. Note that throughout this specification, like elements from the figures will be referred to using like reference numerals. Bushings 26 support anti-roll bar 12 at the bulkhead 14 (as shown in FIG. 1). Anti-roll bar 12 also passes through selectively operated anti-roll bar restrictors 44 and 48 which are secured to the bulkhead 14 or other portion of the sprung mass. Restrictors 44 and 46 are spaced lengths L1 apart and are also spaced length L1 from the respective ends of central rod 24, with the overall length of central rod 24 being the 3×L1. Further, reaction arms 20 and 22 are each of a length L2. In operation, when the sprung mass rolls over the longitudinal roll axis, a sensor, described with respect to FIG. 4, detects this roll. During normal operation, restrictors 44 and 46 are not activated and allow uninhibited twisting of central rod 24 about its longitudinal axis, providing a conventional anti-roll bar having a torsional length of 3×L1. When a vehicle body (i.e., the sprung mass) rolls beyond a threshold level, one of restrictors 44 or 46 is actuated to reduce axial twist of central rod 24, thereby reducing the torsional length of central rod 24 to L1 for one reaction arm and 2×L1 for the other reaction arm.

By way of example, as shown in FIG. 1, reaction arm 22 attaches to the right side of the vehicle body and reaction arm 20 attaches to the left side of the vehicle body. During a left hand turn, as a result of roll about the longitudinal roll axis of the sprung mass, reaction arm 22 moves in a relative upward direction and reaction arm 20 moves in a relative downward direction relative to the sprung mass. When this roll exceeds a threshold level, restrictor 44 is actuated to clamp central rod 24, thereby reducing the torsional length to reaction arm 22 from 3×L1 to L1 because the clamping action inhibits twist along the length 3×L1 of central rod 24. The reduction in torsional length causes a corresponding increase in the torsional force urging reaction arm 22 in an upward direction relative to control arm 32 (i.e., the sprung mass). Also, during the left hand turn, reaction arm 20 moves in a downward direction relative to control arm 28. By actuating restrictor 44, the torsional length of central rod 24 operating on reaction arm 20 is 2×L1. Of course, it will be understood that during a right hand turn, the same effect occurs except selectively activated clamp 46 is activated while selectively operated clamp 44 remains deactivated.

Further in accordance with this invention, FIG. 3 depicts restrictor 44 as a hydraulically operated clamp and also depicts the fluid circuit for operating restrictor 44. Of course, it will be understood that a similar circuit is applicable to restrictor 46. In the embodiment of FIG. 3, hydraulic restrictor 44 has a housing 52 which engages a keyed section 25 of central rod 24 of anti-roll bar 12. A circular seal 54 at opposite ends of the housing 52 prevents leaks between roll bar central rod 24 and the housing 52. Housing 52 is divided into two hydraulic chambers 56 and 58 which are hydraulically separated by linear seals 60 and 62. Chambers 56 and 58 are both filled with hydraulic fluid and are fluidly connected by hydraulic lines 64. Hydraulic reservoir 66 stores hydraulic fluid 68 and communicates with hydraulic fluid chambers 56 and 58 and hydraulic lines 64 through ball and check valve 70. Solenoid valve 72 modulates fluid flow between hydraulic chamber 58 and hydraulic chamber 56 by enabling and disabling fluid flow through hydraulic lines 64. As shown, solenoid valve 72 is a two position, spring return valve which is normally open. When the solenoid 74 is energized by application of an electrical signal on control line 76, the solenoid valve 72 closes, thereby restricting fluid flow between fluid chambers 56 and 58 through hydraulic lines 64. Optionally, a bleed port 77 interconnects hydraulic fluid chambers 56 and 58 and enables a lesser volume of fluid flow between the hydraulic chambers 56 and 58, thereby allowing minor rotation of central rod 24. In operation, when roll bar central rod 24 rotates or twists in response to vehicle roll about the longitudinal roll axis, hydraulic fluid flows between hydraulic chambers 56 and 58 through solenoid valve 72 and hydraulic lines 64. When the sprung mass rolls about the longitudinal axis beyond a threshold value, solenoid valve 72 is energized to disable fluid flow between hydraulic chambers 56 and 58 over hydraulic lines 64, thereby preventing rotation of and changing the torsional length of roll bar central rod 24.

Figure 4:
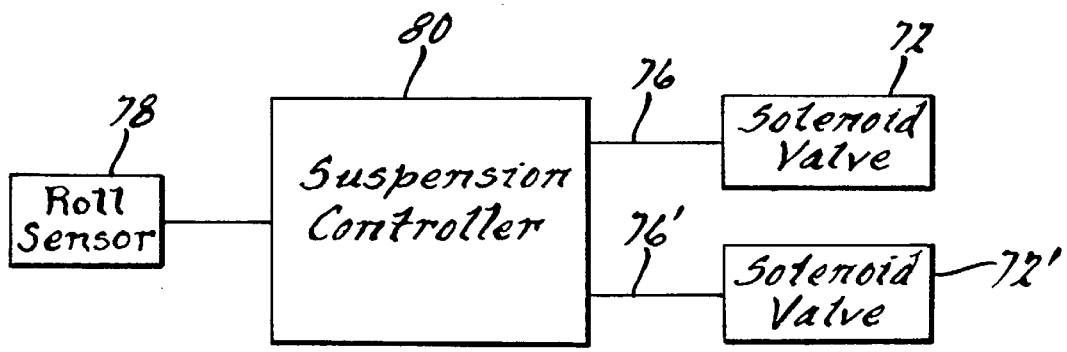
FIG. 4 is a block diagram of the electrical control system for actuating the anti-roll bar restricting devices in accordance with a preferred embodiment of this invention.

Further in accordance with this invention, FIG. 4 depicts a block diagram of an electronic control system for activating restrictors 44 and 46. A roll sensor 78 detects the roll of the vehicle body (i.e., the sprung mass) about the longitudinal roll axis. Sensor 78 generates an electronic signal which is input into suspension controller 80. Suspension controller 80 receives the signal and determines the vehicle roll about the longitudinal roll axis. When roll about the longitudinal roll axis exceeds a threshold value, suspension controller 80 generates electronic control signals which are output on lines 76 (or 76') to activate solenoid valves 72 (or 72'). It will be appreciated by one skilled in the art that the particular solenoid valve 72 or 72' activated depends upon the direction of roll by the sprung mass about the vehicle roll axis, as has been described herein. It will further be appreciated by one skilled in the art that roll sensor 78 may be any of a number of roll sensors well known in the art. It will further yet be appreciated by one skilled in the art that greater than one roll sensor may optionally be used to detect vehicle roll about the longitudinal roll axis.

Figure 5:
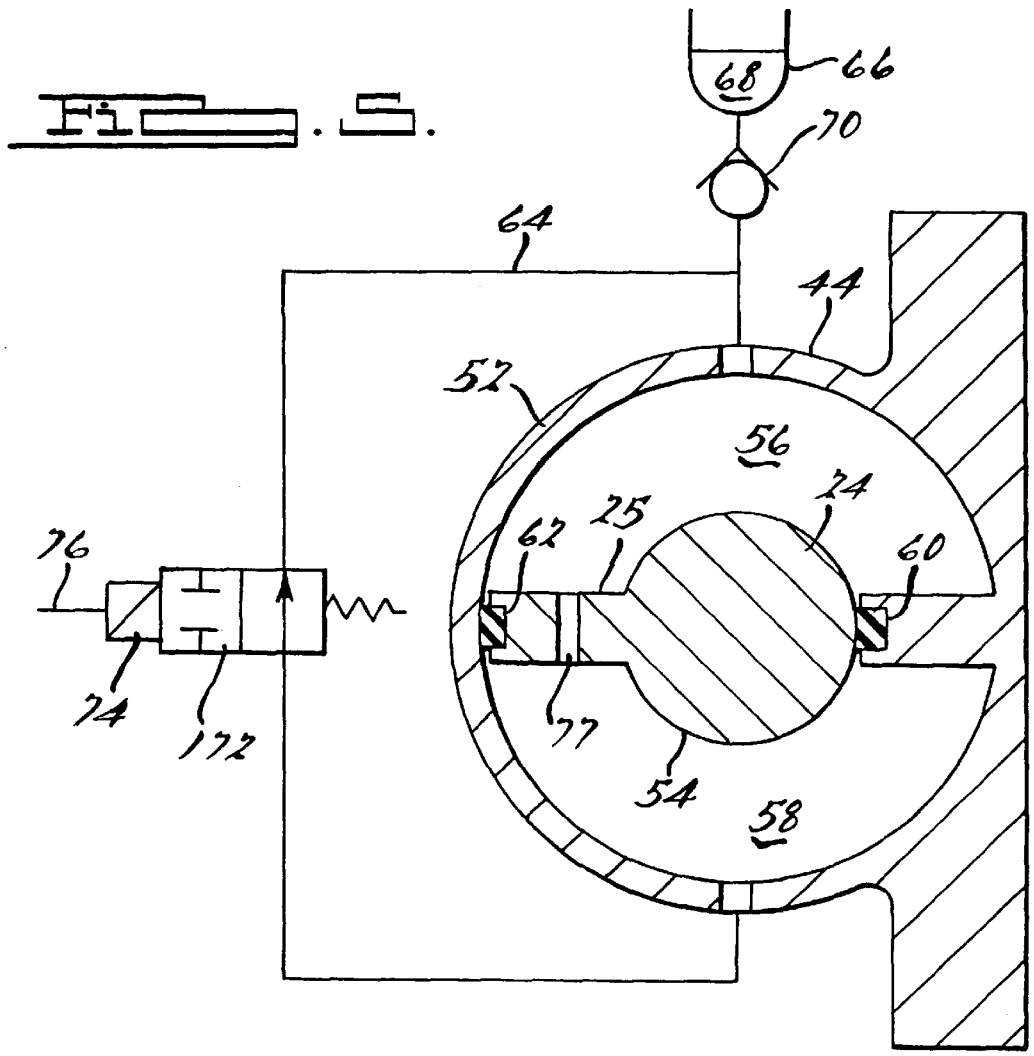
FIG. 5 is a cross-section similar to FIG. 3 but showing a variable solenoid valve.
Figure 6:
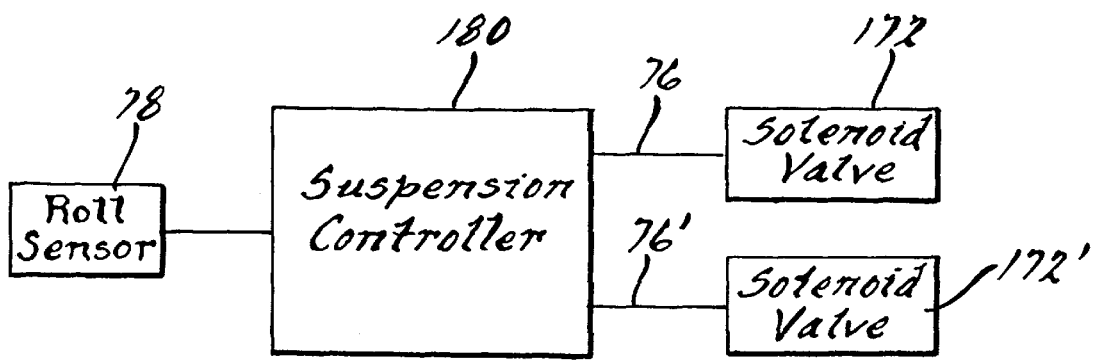
FIG. 6 is a block diagram similar to FIG. 4 but showing a modified suspension controller which outputs a variable control signal.

It will also be appreciated by one skilled in the art that restrictors 44 and 46 may optionally be activated simultaneously, thereby reducing the torsional length of central rod 24 with respect to both reaction arms 22 and 20. Such a configuration may be effective to moderate the roll or pitching of relatively heavy vehicles. Further, it will be appreciated by one skilled in the art that restrictors 44 and 46 may be variably adjustable clamping devices. Such modification is easily effected by substituting a variable solenoid valve 172 and 172' for the two-positioned solenoid valve 72 and 72' shown in FIGS. 3 and 4 and providing a modified suspension controller 180, to output a variable control signal on control lines 76 (and 76') as shown in FIGS. 5 and 6.

While the above description constitutes a preferred embodiment of the invention, it will be appreciated that the invention is susceptible to modification, variation and a change without departing from the proper scope or fair meaning of the accompanying claims.

What is claimed is:

1. A vehicle suspension system comprising:
    a frame;
    first and second wheel assemblies connected to the frame;
    a pendular U-shaped roll bar having a central section rotatably mounted to the frame and first and second reaction arms associated with a respective wheel assembly;
    a first link connecting the first wheel assembly with the first reaction arm;
    a second link connecting the second wheel assembly with the second reaction arm;
    a selectively operable first roll bar restrictor mechanically communicating with the roll bar central section, the first roll bar restrictor enabling rotational movement of the central section in a first operating mode and limiting rotational movement of the central section in a second operating mode; and
    a selectively operable second roll bar restrictor mechanically communicating with the roll bar central section, the second roll bar restrictor enabling rotational movement of the central section in a first operating mode and limiting rotational movement of the central section in a second operating mode.

2. The invention as recited in claim 1, wherein in response to rotational movement of the central section, the first reaction arm exerts a stiffening force on the first wheel assembly when the first roll bar restrictor is in the first operating mode and exerts an increased stiffening force on the first wheel assembly when the first roll bar restrictor is in the second operating mode.

3. The invention as recited in claim 2, wherein in response to rotational movement of the central section, the second reaction arm exerts a stiffening force on the second wheel assembly when the second roll bar restrictor is in the first operating mode and exerts an increased stiffening force on the second wheel assembly when the second roll bar restrictor is in the second operating mode.

4. The invention as recited in claim 3, wherein the first roll bar restrictor is operable to variably limit rotational movement of the central section within a range between the first and second operating modes.

5. The invention as recited in claim 3, wherein the second roll bar restrictor is operable to variably limit rotational movement of the central section within a range between the first and second operating modes.

6. The invention as recited in claim 3, wherein in response to rotational movement of the central section, the first and second reaction arms substantially simultaneously exert a stiffening force on the respective first and second wheel assemblies when the first and second roll bar restrictors are in the first operating mode, respectively, and substantially simultaneously exert an increased stiffening force on the first and second wheel assemblies when the first and second roll bar restrictors are in the second operating mode, respectively.

7. The invention of claim 1, wherein each of the first and second restrictors further comprises:
    a housing having first and second chambers and engaging the central section of the anti-roll bar, the first and second chambers containing hydraulic fluid;
    a hydraulic control line fluidly communicating hydraulic fluid between the first and second chambers such that rotational movement of the central section of the anti-roll bar induces fluid flow between the first and second chambers;
    control valve means interposed in the hydraulic control line wherein the control valve means enables fluid communication between the first and second chambers in a first position and restricts fluid communication between the first and second chambers in a second position;
    whereby the respective restrictor enables rotational movement of the central section when the control valve means is in the first position and restricts rotational movement of the central section when the control valve means is in the second position.

8. The invention as recited in claim 7, wherein the valve means is an electrically operated solenoid valve operable between a range of positions between fully open and fully closed.

9. The invention as defined in claim 1, wherein the links are operatively connected with the wheel assemblies at a front of the vehicle.

10. The invention as defined in claim 1, wherein the links are operatively connected with the wheel assemblies at a rear of the vehicle.

11. A vehicle suspension system comprising:

a frame;

first and second wheel assemblies connected to the frame;

a pendular U-shaped roll bar having a central section rotatably mounted to the frame and first and second reaction arms associated with a respective wheel assembly;

a first link connecting the first wheel assembly with the first reaction arm;

a second link connecting the second wheel assembly with the second reaction arm;

a selectively operable first roll bar restrictor mechanically communicating with the roll bar central section, the roll bar restrictor enabling rotational movement of the central section in a first operating mode and limiting rotational movement of the central section in a second operating mode;

a selectively operable second roll bar restrictor mechanically communicating with the roll bar central section, the second roll bar restrictor enabling rotational movement of the central section in a first operating mode and limiting rotational movement of the central section in a second operating mode; and a sensor and controller for sensing vehicle roll and selectively activating the first and second roll bar restrictors in accordance with the sensed roll.

12. The invention as claimed in claim 11, wherein the first roll bar restrictor is located proximately to the first reaction arm, and the second roll bar restrictor is located proximately to the second reaction arm.

13. The invention as claimed in claim 12, wherein when the vehicle rolls in a direction of the first reaction arm, the controller activates the first roll bar restrictor.

14. The invention as claimed in claim 13, wherein when the vehicle rolls in a direction of the second reaction arm, the controller activates the second roll bar restrictor.

15. A vehicle suspension system comprising:

a frame;

first and second wheel assemblies connected to the frame;

a pendular U-shaped roll bar having a central section rotatably mounted to the frame and first and second reaction arms associated with a respective wheel assembly;

a first link connecting the first wheel assembly with the first reaction arm;

a second link connecting the second wheel assembly with the second reaction arm;

a selectively operable first roll bar restrictor located proximately to the first reaction arm and mechanically communicating with the roll bar central section, the first roll bar restrictor enabling rotational movement of the central section in a first operating mode and limiting rotational movement of the central section in a second operating mode;

a selectively operable second roll bar restrictor located proximately to the second reaction arm and mechanically communicating with the roll bar central section, the second roll bar restrictor enabling rotational movement of the central section in a first operating mode and limiting rotational movement of the central section in a second operating mode; and a sensor and controller for sensing vehicle roll and selectively activating the first and second roll bar restrictors in accordance with the sensed roll.

* * * * *

UNITED STATES PATENT AND TRADEMARK OFFICE
CERTIFICATE OF CORRECTION

PATENT NO. : 5,882,017
DATED : March 16, 1999
INVENTOR(S) : Jan Carleer

It is certified that error appears in the above-identified patent and that said Letters Patent is hereby corrected as shown below:

Title Page, [57] Abstract, line 6, delete "a"

Title Page, [57] Abstract, line 10, "section" should be --rod--

Col. 4, line 2, delete "48" and substitute --46-- therefor

Signed and Sealed this

Ninth Day of November, 1999

Attest:

Q. TODD DICKINSON

Attesting Officer

Acting Commissioner of Patents and Trademarks